United States Patent

Bowater et al.

[11] Patent Number: 5,812,644
[45] Date of Patent: Sep. 22, 1998

[54] VOICE PROCESSING SYSTEM WITH TELEPHONE INTERFACE SUBSYSTEM

[75] Inventors: Ronald John Bowater; Nicholas David Butler, both of Romsey; Mervyn Anthony Staton, Eastleigh, all of United Kingdom

[73] Assignee: International Business Machines Corp., Armonk, N.Y.

[21] Appl. No.: 658,794

[22] Filed: Jun. 5, 1996

[30] Foreign Application Priority Data

Jun. 9, 1995 [GB] United Kingdom ............... 9511789

[51] Int. Cl.⁶ ................................................ H04M 11/00
[52] U.S. Cl. ............................. 379/93.14; 379/93.07; 379/93.06
[58] Field of Search ........................ 379/67, 84, 88, 379/89, 90.01, 93.01, 93.05, 93.06, 93.07, 93.14, 201, 214; 370/389, 392, 352, 485, 404

[56] References Cited

U.S. PATENT DOCUMENTS

| | | | |
|---|---|---|---|
| 5,394,460 | 2/1995 | Olson et al. ........................... | 379/89 |
| 5,454,030 | 9/1995 | De Oliveira et al. ..................... | 379/88 |
| 5,495,484 | 2/1996 | Self et al. .................................. | 379/84 |
| 5,526,353 | 6/1996 | Henley et al. ........................... | 370/392 |
| 5,533,105 | 7/1996 | Brown et al. ............................. | 379/88 |
| 5,555,288 | 9/1996 | Wilson et al. ............................ | 379/67 |
| 5,581,611 | 12/1996 | Yunoki ..................................... | 379/201 |
| 5,657,446 | 8/1997 | Pinard et al. ............................ | 379/201 |

FOREIGN PATENT DOCUMENTS 0353890  5/1995  European Pat. Off. ............ H04J 3/12

OTHER PUBLICATIONS

UK application 9418942.0 (IBM Docket UK9–94–040) filed Sep. 20, 1994.

*Primary Examiner*—Stella Woo
*Attorney, Agent, or Firm*—Jeanine S. Ray-Yarletts

[57] ABSTRACT

A voice processing system comprises a computer workstation 80 running a voice system software and a telephony interface module 70 which is attached via a trunk line 100 to a telephone switch 10. The computer system 80 and the telephony interface module 70 are connected by a standard data connection 230 such as a SCSI connection over which voice data is exchanged. The SCSI interface is provided with a voice device driver capable of handling voice data by means of an appropriate set of commands.

13 Claims, 5 Drawing Sheets

VOICE PROCESSING SYSTEM WITH TELEPHONE INTERFACE SUBSYSTEM

FIELD OF THE INVENTION

This invention relates to voice processing systems, and more particularly, to telephony interface subsystems in voice processing systems.

BACKGROUND OF THE INVENTION

Voice processing systems, which are well-known in the art (see for example "Voice Processing", by Walt Teschner, published by Artech House), perform a variety of functions, the most common of which is voice mail (also known as voice messaging), whereby callers who cannot reach their intended target can instead record a message for them for subsequent retrieval. Another important form of voice processing system is a voice response system (VRU), in which callers interact with the VRU, generally by means of pressing DTMF keys, in order to obtain desired information. Other features that have been or are being incorporated into voice processing systems include voice recognition (typically so that callers can enter responses into the system without having to use DTMF keys), and text to speech, whereby ASCII data can be read out to a caller. It should be appreciated that there are no clear dividing lines between the different categories of voice mail system, VRU, and so on; rather the term voice processing system is used herein to broadly denote any type of system which can sit at or terminate one end of a telephone line. Generally voice processing systems are implemented on computers, with additional telephone interface hardware, see eg U.S. Pat. No. 4,663,777. Often an application running on the computer is specially developed by the customer (ie the owner of the voice processing system) to control the interaction between the caller and the voice processing system. This is particularly true for VRUs which normally need to be customised to meet the requirements of any given customer. Frequently, the development of the controlling application program represents a significant investment of time and money by the customer.

The simplest voice processing systems have as their input a conventional analog telephone line, in other words, they can plug into a socket in place of a normal telephone set. Typically in such systems the telephone interface is provided as an adapter card for attachment inside the computer workstation. An example of a voice processing system of this type is the DirectTalk/2 system available from IBM Corporation. However, this requires a computer workstation having enough room for housing the card, and makes it difficult to upgrade or maintain such cards whilst the machine is in operation. Moreover, such analog-based systems have limited call capacity (ie the number of incoming telephone lines which can be simultaneously supported is relatively low), and are also restricted in the type of service that they can operate. U.S. Pat. No. 5,289,465 discloses a somewhat similar type of system, based on an ISDN (ie digital) connection, rather than an analog connection.

More sophisticated voice processing systems have a digital trunk connection, either to a switch or directly into the digital telephony network. Such voice processing systems are often installed at the sites of customers who have a relatively large volume of incoming or outgoing telephone calls and therefore have their own switch. Thus the voice processing system makes or receives telephone calls through the switch over one or more digital trunk lines.

For customers who do have a switch, it is often desirable to use the same switch in all countries, which may well allow them to negotiate a lower price for the switches, and it is also likely to reduce service costs for the customer. An additional benefit is that by allowing the same combination of application program and switch in all countries, compatibility problems are minimized (eg an application may exploit a particular feature of the chosen switch).

Modern telephony signals are generally transmitted in digital form, using standard 8-bit samples at a rate of 8 kHz, thereby requiring an overall bandwidth of 64 kbits per second. The nature of audio signals is such that an essentially logarithmic quantization allows the best representation of the original analog input. Two quantization laws in particular are widely used; an A-law compression (or commanding) in Europe, and a mu-law compression in North America, and are defined by recommendation G.711 in the CCITT "Yellow Books". To allow large volumes of telephone traffic to be handled simply, individual signals are time multiplexed together for transmission over digital trunk lines. In North America, the standard form of trunk line is known as T1, and provides 24 simultaneous lines, each capable of handling a single 64 kbits per second telephone signal. In Europe, the standard form of trunk line is known as E1, and provides 30 simultaneous lines. Several T1 or E1 lines can be grouped together in a trunk line to provide greater overall capacity.

The trunk lines not only carry the actual audio telephone conversations, but can also be used to provide a limited degree of signalling between the switch and the voice processing system. This is referred to as channel associated signalling (CAS). However, the amount of signalling available over a T1 or E1 line is very limited, so that often there is a separate link from the switch to the voice processing system to provide such information. Unfortunately, there is no agreed form of link provided by all switch manufacturers.

Vendors of voice processing equipment are finding that it is much more cost effective to build systems around general-purpose computers (e.g. the IBM Risc System/6000) rather than developing dedicated voice processing equipment. This avoids costly hardware development, and the voice processing application can run on the operating system of general purpose computers, taking advantage of their technological advances. Further, the voice processing equipment can take advantage of any hardware or software supported by the general purpose computer, as well as pre-existing maintenance facilities.

However, in order to interface to digital or analog telephone networks, special hardware is needed. This hardware often has multiple digital signal processors (DSPs) to provide functions such as: voice compression and decompression, touchtone (DTMF) detection and generation, inbound and outbound signalling to the telephone network, modem (data and fax) receive and transmit, and is connected to the general purpose computers of the voice processing system by a proprietary link.

However the hardware and the software to support the interface between the telephone and the general purpose computer of the voice processing system tends to be expensive for a number of reasons, including their complexity, low volume production and development expense. In fact the following requirements for this interface need to be satisfied:

1. it should be fast and able to provide a high bandwidth to support multiple channels of voice data, this means typically 8 k bytes/second per active channel in each direction;
2. depending on the application the interface should allow for voice data flow to be isochronous, i.e. with a minimal time delay and able to sustain a continuous data rate from the voice channel;

3. it must be able to carry traffic in both directions simultaneously;
4. depending on the application, the interface should be able to carry control information as well as voice data;
5. the link should provide multi-drop capability for both sources and destination, e.g. allow multiple VRU devices connected to multiple switches, for example for load balancing or providing redundancy;
6. it needs to be flexible over what connection lengths can be used;
7. Radio Frequency Interference (RFI) from the cable should be kept to a minimum.

It is an object of the invention to provide an improved voice processing system. It is a further object of the invention to provide a voice processing system which addresses the above-mentioned problems and requirements.

SUMMARY OF THE INVENTION

Accordingly, the present invention provides a voice processing system adapted to interface to a telephone network, comprising a computer workstation attached to an interface device connected with the telephone network, the apparatus being characterised in that the computer workstation is attached to the interface device by a standard data connection over which real time voice telephony data is transmitted.

The majority of current computer systems automatically include, or have available as an inexpensive option, several forms of high throughput standard external data interfaces. These are intended for connection to computer networks (e.g. using ethernet) or peripheral devices (e.g. using SCSI). The future trend is to provide higher bandwidth I/O devices, such as Asynchronous Transfer Mode (ATM). This trend applies even on entry level computers, to facilitate multimedia and other wide area applications on the desktop.

This invention recognizes that the cost constraints associated with the proprietary interfaces of the prior art can be overcome by the utilization of these standard data connections to provide a telephony interface connection, thereby allowing the above requirements to be satisfied. The components of the link, i.e. the adapter at each end plus the cable itself, are available as off-the-shelf computer system parts and allow a wide choice of support hardware.

A range of possible standard data connections can be used, including SCSI, FDDI, ATM, and SSA (a proposed serial architecture). All of these have sufficient bandwidth to allow the real-time exchange of multiple telephony channels between the computer workstation and the telephone interface device, and can be obtained as standard or low-cost options on conventional computer workstations, with supporting hardware readily available.

In order to utilize such a standard interface to provide a voice/telephony interface it is necessary to format the data in accordance with the standard protocol for that interface. For example, SCSI is designed to operate with data organized in blocks, e.g. the data from a complete disk sector, so that the same block size is encountered for each write and read. In contrast, telephony data is effectively continuous, with no inherent breaks. Therefore, in a preferred embodiment of the present invention, the voice telephony data are split into blocks of fixed duration for transmission over the standard data connection.

The invention also provides a group of voice processing systems as wherein each computer workstation and each interface device are attached to one another sharing the same standard data connection. In the simplest configuration there may be simply two voice processing system workstations and one interface device. A particular advantage of using a standard data connection with a multi-drop facility (such as SCSI) in this manner, is that it provides a hot stand-by capability, whereby calls can be switched from a first voice processing workstation to a second, if a fault appears on the first, thereby improving overall reliability. Note although for SCSI the standard data connection linking the voice processing systems is actually a single bus, this does not have to be the case, provided only that the voice processing systems have the capability to exchange telephony data with each other.

In a preferred embodiment, the telephone interface device is connected to the telephone network by one or more trunk lines, typically digital E1 or T1 lines. Such high bandwidth, all-digital configurations are particularly suited to the digital transmission capabilities provided by a standard data connection. However, there is no reason why the interface device could not receive analog lines, although in this case it would need to perform analog to digital conversion. As is known in the art, the interface device effectively converts the E1/T1 voice data into separate channels (and vice versa). Only voice data for currently active channels needs to be transmitted between the voice processing workstation and the interface device.

One particular advantage that may be realized from the invention stems from the fact that nowadays many switches are basically a computer device, e.g. they comprise a set of rack-mounted VME based 680x0 cards, and are generally already provided with standard data connections, such as SCSI chips. The switch performs most of the telephony functions required by a voice processing system, such as DTMF detection, E1/T1 demultiplexing, etc. Thus in a preferred embodiment, the interface device is actually the telephone switch, which is used to perform the necessary telephony functions, and the standard data connection is simply used to transport the voice (plus control) data from the switch to the voice processing system, and vice versa. This arrangement exploits the fact that both the voice processing workstation and the switch can both easily support the standard data connection, and avoiding the need for any separate switch-specific connection to be supported. Note that in this case the voice processing system no longer needs to include specific telephone interface hardware, thereby achieving a significant expense saving.

BRIEF DESCRIPTION OF THE DRAWINGS

The present invention will be described further, by way of example only, with reference to an embodiment thereof as illustrated in the accompanying drawings, in which.

DETAILED DESCRIPTION OF THE PREFERRED EMBODIMENT

Figure 1:
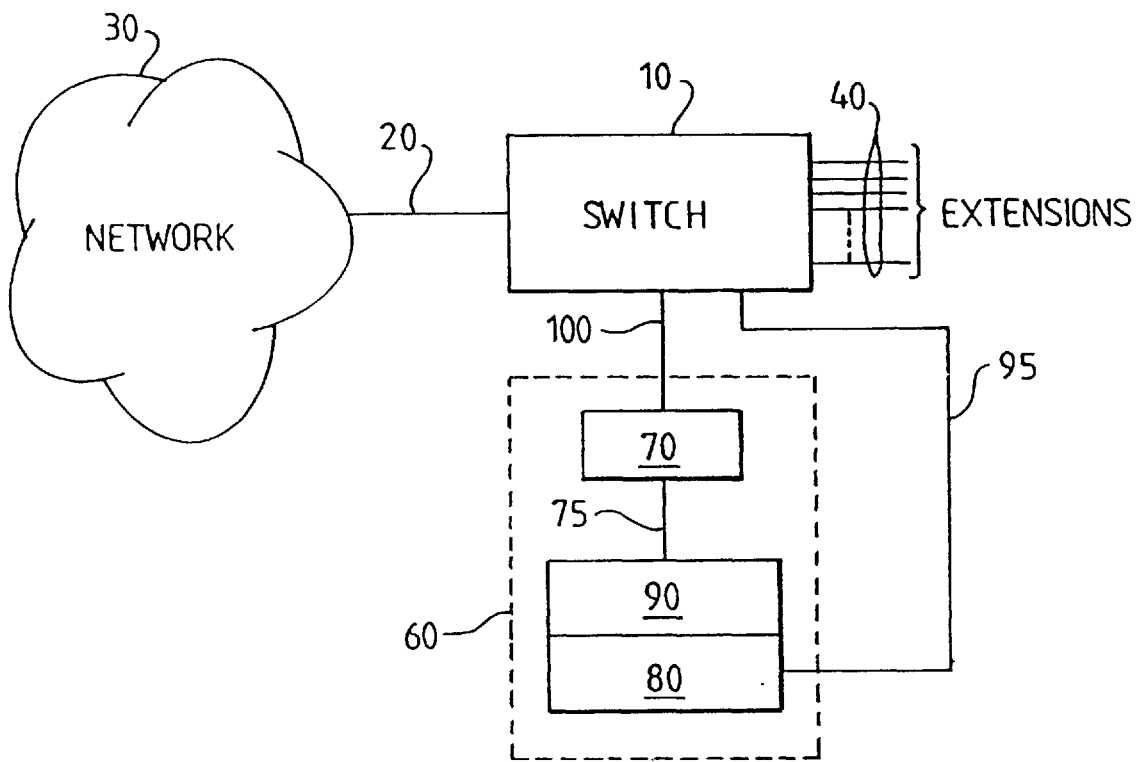
FIG. 1 is a simple block diagram showing a conventional voice processing system connected to a telephone switch.

FIG. 1 is a simple block diagram showing a switch 10 which exchanges telephony signals with the external telephone network 30 over digital trunk line 20. Attached to the switch are a plurality of conventional telephone extensions 40; these are of no direct relevance to the present invention and so will not be described further. Also attached to the switch via a digital trunk line 100 is a voice processing system 60. As shown, the voice processing system is a DirectTalk/6000 system (ie runs the DirectTalk/6000 software), but the same principles apply whatever voice processing system is being used.

The DirectTalk/6000 system comprises two main hardware components, a telephone interface module 70 (also termed a digital trunk processor), and computer workstation 80, which in the case of the DirectTalk/6000 system is a RISC System/6000. Also shown is a proprietary adapter card 90, which provides an interface between the RISC System/6000 and the telephone interface module. The two parts are linked by a specially-designed proprietary connection 75. The DirectTalk/6000 system (software plus hardware) is available from IBM Corporation, and is described more fully in IBM Callpath DirectTalk/6000 General Information and Planning (reference number GC22-0100-03), also available from IBM, and the other manuals referenced therein. As stated above, although the invention is being described with reference to the DirectTalk system, it is applicable to many other voice processing systems.

The digital trunk line 20 attached to the switch 10 and the line 100 connecting the digital trunk processor 70 with the switch 10 are standard telephony (E1 or T1) trunks. The T1/E1 format is supported by both the switch 10 and the digital trunk processor 70, and is well known in the art and so will not be described in detail herein.

In some implementations a control interface is provided to the switch 10. This link 95 allows the switch 10 to inform the software running on the workstation 80 of incoming calls, allowing relevant information to be passed, such as the called and the calling numbers. In the same way over the same connection 95 the switch receives control requests, e.g. to transfer a call.

Figure 2:
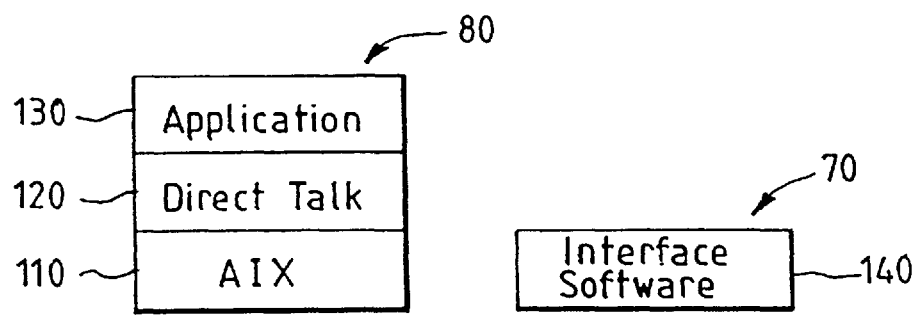
FIG. 2 illustrates the main software components of the voice processing system of FIG. 1.

FIG. 2 is a simple block diagram of the main software components of a DirectTalk/6000 system. Running on the RISC System/6000 is first of all the operating system 110 for the workstation, which in the present case is AIX, and then the DirectTalk/6000 software 120 itself. Finally, also running on the RISC System/6000 workstation is an application 130, generally developed by the customer, which interacts with the operating system and the DirectTalk/6000 software to provide the desired telephony function. Various routines 140 also run within the digital trunk processor 70. These routines are downloaded from the RISC System/6000 onto the telephone interface module when the digital trunk processor is enabled, and handle items such as detection of tones, silence, and voice, and the generation of tones. There is also some software on the adapter card 90, which primarily serves simply to transfer data between the RISC System/6000 workstation and the telephone interface module.

Figure 3:
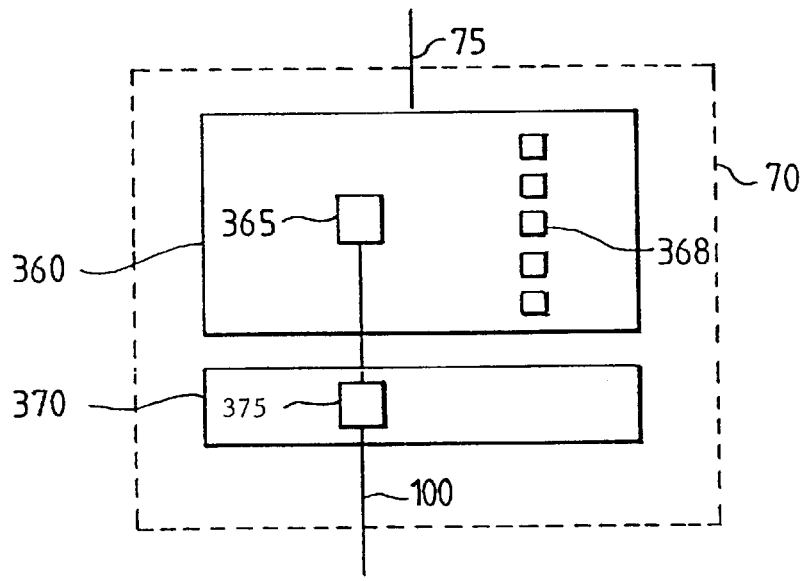
FIG. 3 is a more detailed diagram of the structure of a telephone interface module of FIG. 1.

FIG. 3 depicts the contents of the telephone interface module in more detail. In particular, this module comprises two sets of cards, a trunk interface card (TIC) 370 and a V-Pack card 360. There is one V-Pack and one TIC for each T1/E1 trunk connection between the switch and the voice processing system. The TIC includes an ACFA chip 375, which is an industry standard chip available from Siemens, and is used to detect or insert signalling for incoming or outgoing calls respectively on trunk line 100. The V-pack contains a set of six digital signal processors (DSPs), comprising one master DSP 365 and five associated slave DSPs 368. Each slave DSP processes six channels within a T1/E1 trunk, so that the set of five slave DSPs can handle all thirty channels for an E1 trunk (in the case of a T1 trunk connection one of the slave DSPs is not required).

Figure 4:
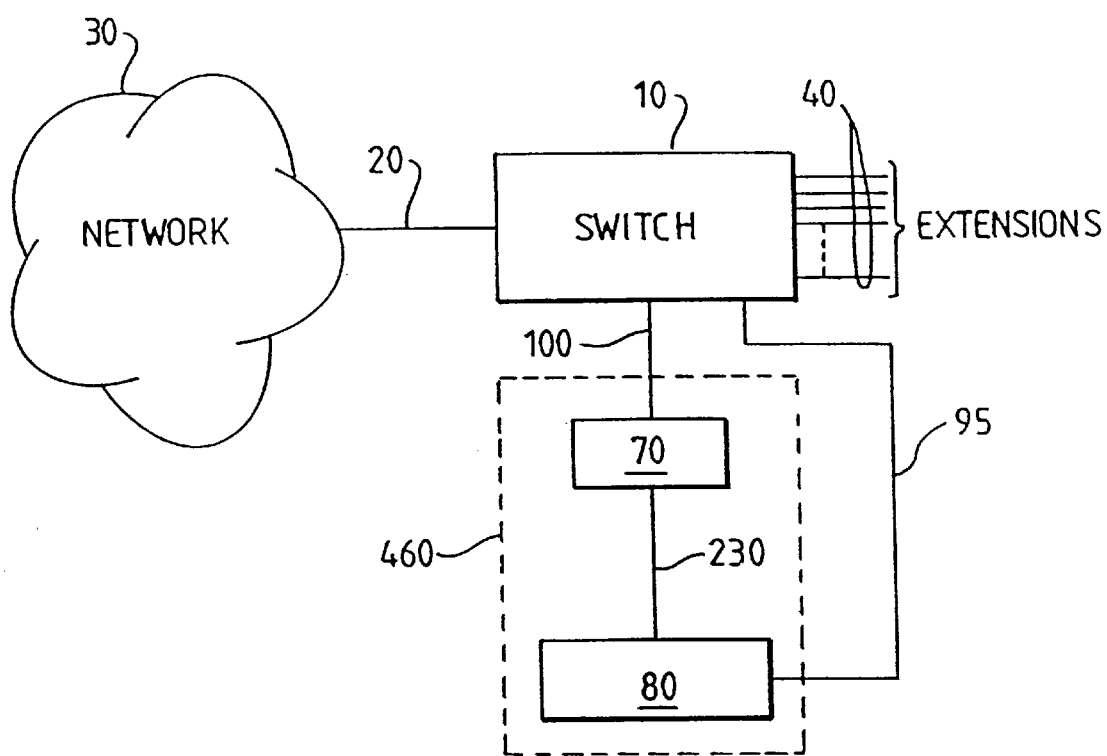
FIG. 4 is a simple block diagram showing a voice processing system in accordance with the present invention.

FIG. 4 is a simple block diagram of the present embodiment. As before, a switch 10 exchanges telephony signals with the external telephone network 30 over digital trunk line 20. Attached to the switch via a digital trunk line 100 is a voice processing system 460, which again for the sake of example will be assumed to be the DirectTalk/6000 system running on a RISC System/6000 workstation. As in the prior art environment, most of the digital signalling processing required to handle a digital call is carried out in DSPs in the telephony interface module 70, and a conventional control interface may be provided to the switch 10 to allow the switch to inform the software running on the workstation 80 of incoming calls, etc.

The system 460 differs from the prior art embodiment of FIG. 1 in that the telephone interface module 70 and the computer workstation 80, are linked by a standard data connection 230 that carries voice data, telephony signalling and control information between the two. In the preferred embodiment, the standard data connection is a SCSI connection. In this case there is no need for an additional telephony adapter card on the workstation 80, because SCSI support is standard on RISC System/6000 workstations.

In the prior art, the SCSI interface has been used to connect a computer to a peripheral storage device, such as a tape or disk drive. However, the inventors have realized that the SCSI interface is in fact very appropriate to the repetitive, block nature of the voice data. Thus the voice data can be split into a series of blocks of the same length, and these blocks can be easily read and written, i.e. exchanged, using the SCSI standard protocol. In addition the cited requirements for a voice interface are satisfied, in that the SCSI interface can support up to 8 Mbyte/second, can carry traffic in both direction simultaneously and moreover can issue more commands without stopping the traffic on the line and waiting for the answers. The Radio Frequency Interference from the cable can be kept very low and as already mentioned this kind of interface is an industry standard which implies that all the components of the link are available as off-the shelf computer system parts. Furthermore a wide range of support hardware is already provided with a SCSI built-in interface.

Figure 5:
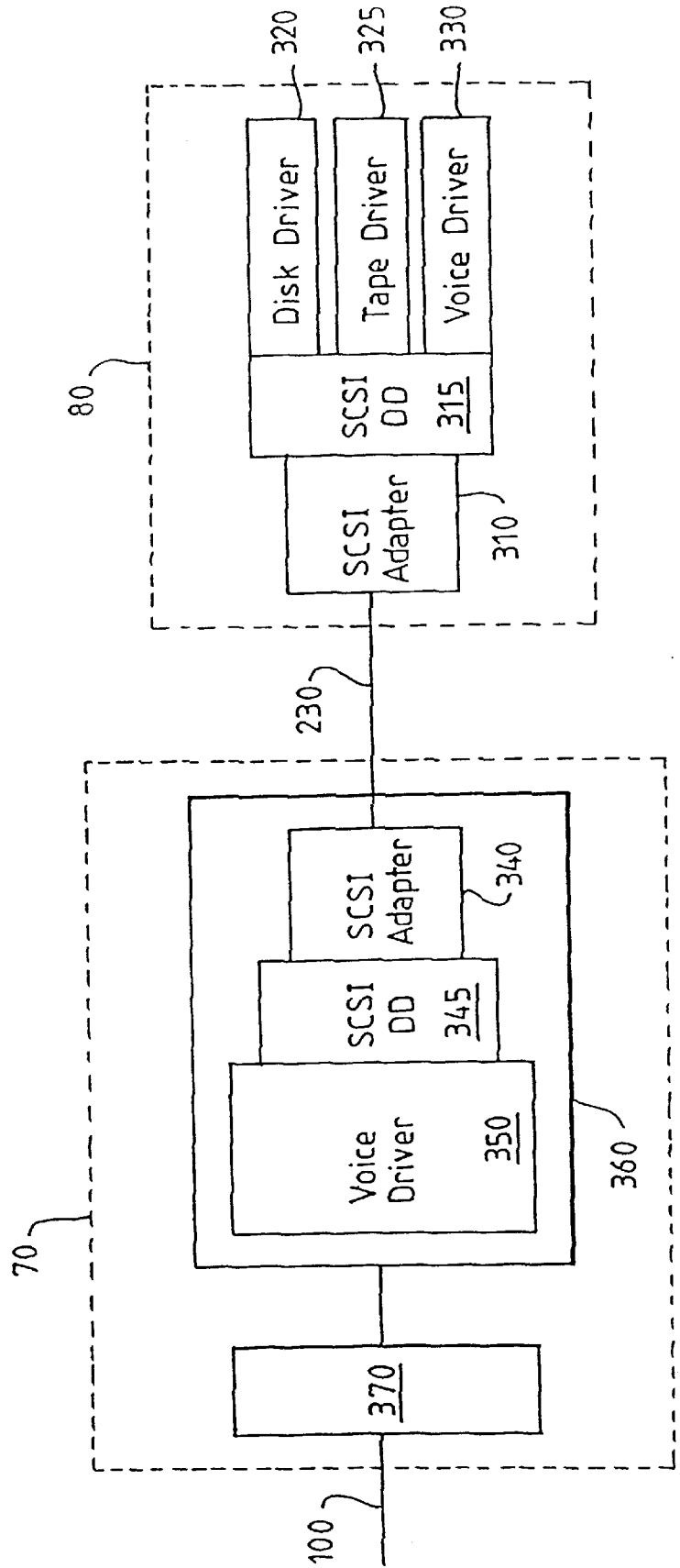
FIG. 5 is a more detailed diagram showing the interface to the standard data connection of FIG. 4.

FIG. 5 is a schematic diagram showing how the main components of the voice processing system interface to the SCSI link 230. Only those components relevant to an understanding of the present invention will be described, and so the description will be limited to those components which interface to the link 230.

In workstation 80 a standard SCSI interface adapter card 310 is provided in the basic configuration of the RISC System/6000 workstation. Associated with the SCSI adapter 310 is a SCSI device driver 315, which in turn is associated with a set of different device drivers which can manage the adapter 310. For instance a disk driver 320 and a tape driver 325 are usually provided as part of the workstation operating system, together with SCSI device driver 315 itself, to manage data stored on a conventional media device such as a disk or a tape. In accordance with the present invention, a voice driver 330 is also added to control the SCSI link to the telephony interface module 70. Preferably the SCSI adapter 310 is dedicated to telephony voice driver 330, rather than being shared (eg with a remote data source), since the exchange of telephone data needs a guaranteed bandwidth, which must not be interrupted by other activities on the adapter.

In the same way, the digital trunk processor 70 is provided with a SCSI adapter 340 which is connected with the SCSI adapter 310 of the workstation 80 by a standard SCSI link 230. The SCSI adapter 340 is controlled by a SCSI device driver 345 which is associated with a voice driver 350. Voice drivers 330 and 350 use the standard SCSI protocol to exchange voice data between the workstation 80 and the digital trunk processor 70. For a more detailed description of the standard SCSI protocol reference is made to "American National Standard for information system, Small Computer System Interface-2-Ref. X3.131-198X".

The SCSI adapter 340 is most simply provided as a conventional SCSI chip on the V-Pack card 360. A microprocessor, such as a PowerPC chip, available from IBM, is included on the V-Pack card to run the SCSI driver 345 and voice driver 350. However, it would also be possible to provide the SCSI adapter as a conventional VME rack-mounted card, such as the PowerPC single board computer available from Cetia (France), which includes SCSI support as a standard. The V-Pack would then exchange data with this card using the VME bus (which would have to be added to the V-Pack card). Note that in this case one SCSI adapter could support multiple V-Pack cards.

It will be appreciated of course that although FIG. 5 has been described with reference to the V-pack digital trunk processor cards, any other suitable telephone interface device could be used.

Figure 6:
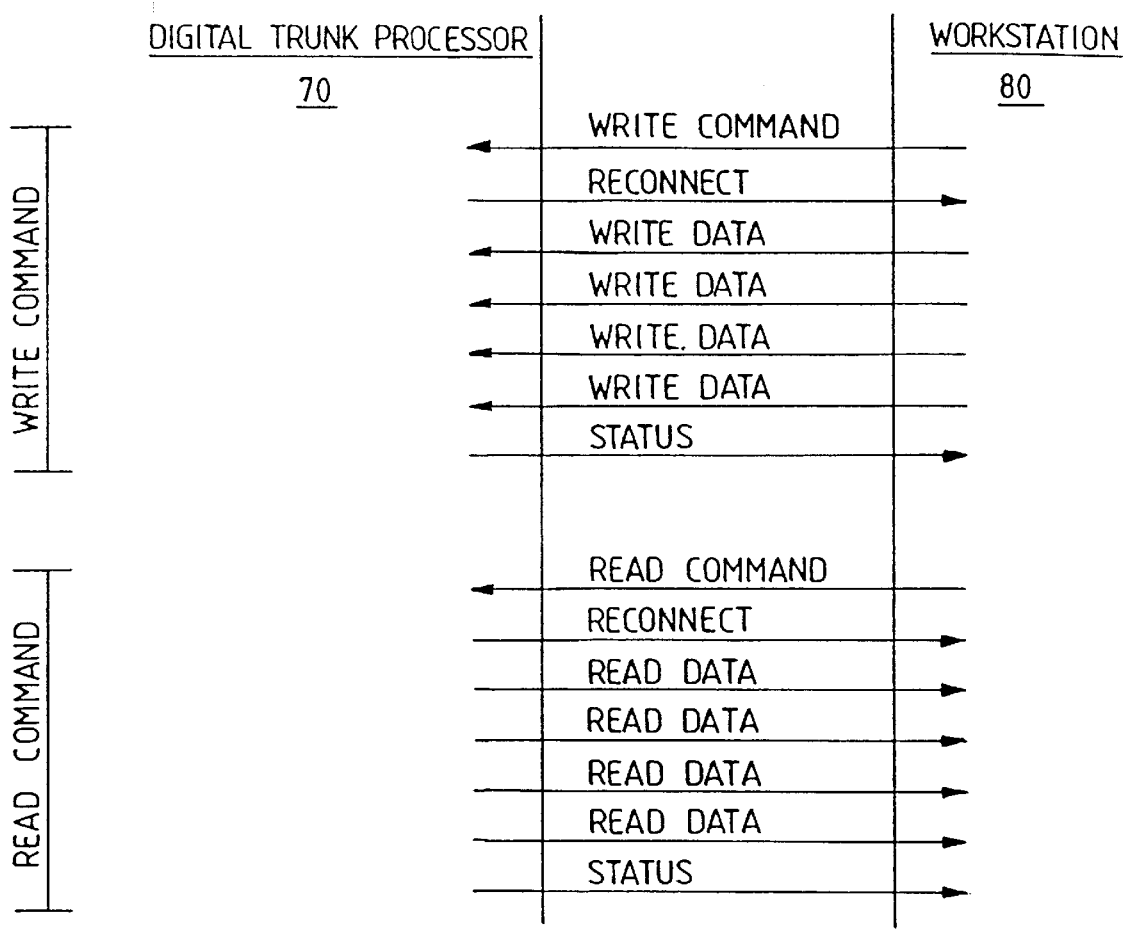
FIG. 6 shows a flow diagram illustrating the processing of exchanging voice data over the standard data connection.

Referring to FIG. 6, the process of exchanging data used by the SCSI connection will be now described. The computer workstation 80 can build and issue a set of commands to the digital trank processor over the SCSI connection for managing the voice data and the telephone signalling. These commands are sent by the computer workstation, as an initiator, to the digital trunk processor, as a target. It will be appreciated that the commands are defined at the level of the voice driver, rather than the SCSI driver, although the former is able to determine whether any particular command is a read or write operation.

The WRITE VOICE DATA command contains a list of the telephony channels (i.e. trunk and timeslot) to be written. This command is issued by the workstation 80 and transported through the link 230 to the digital trunk processor 70. When the digital trunk processor is ready to receive the voice data to be written in the specified channel(s), it sends back to the workstation 80 a reconnect signal. In the workstation 80 voice data corresponding to a predetermined time interval to be transmitted out over the telephony network is split into a set of blocks with a fixed size, as required by the SCSI protocol. Therefore, when the workstation 80 receives the reconnect signal, the set of blocks is transported to the digital trank processor. The digital trunk processor then performs the necessary operations (eg multiplexing) in order to transmit the telephony data out over the digital trunk line(s).

The READ VOICE DATA command is very similar to the write command above described and is issued by the workstation 80 through the link 230 to the digital trunk processor 70. Typically, it contains a list of the telephony channels (i.e. trunk and timeslot) to be read. The incoming voice data are collected or buffered from the channels identified in the read command. These are collected from the telephony data arriving over the incoming trunk lines and processed (eg de-multiplexed) in known fashion for a fixed time period. When the digital trunk processor has the requested voice data available, it sends back a reconnect signal to the workstation, followed by the relevant voice data, split into fixed size blocks. The voice driver 330 then issues an interrupt to inform the processor in workstation 80 that the next set of voice data has arrived. Note that there may well be a delay before the Reconnect command is issued by the digital trunk processor, as it waits for the requested telephony data to accumulate.

In a typical arrangement, the voice driver 330 issues a command set every 20 ms, the command set comprising first a write command, and then a read command. This leads to the system repetitively cycling through the operations shown in FIG. 6. Note that many SCSI adapters for attachment to peripheral devices are only capable of processing about 500 commands a second. The above rate of 50 R/W pairs per second is therefore well within their capabilities. However, if the telephone interface module is to handle multiple trunks, then it may be necessary to assemble the data for the different trunks together, in order to transport it in a single R/W pairing. Of course, it is only necessary to transmit the voice data for those channels which are currently active.

The workstation also needs to exchange status and signalling information with the digital trunk processor. This can be achieved by including the relevant information in a suitably structured read/write block. Alternatively, the READ/WRITE commands can be restricted to actual voice data transport, and other commands defined for this status/signalling information. For example, the following list of other major commands may be employed:

SEND CHANNEL COMMANDS allows the workstation 80 to instruct the digital trunk processor 70 to change the operational mode of each telephony channel e.g. play clear channel, record compressed, perform call progress;

GET CHANNEL STATUS allows the workstation 80 to interrogate the status of telephony channels in the digital trunk processor 70 e.g. DTMF key received, dial tone detected etc;

READ SIGNALLING STATUS allows the workstation 80 to interrogate the signalling associated with the telephony channels on this digital trunk processor 70 e.g. incoming call, hangup, network busy;

WRITE SIGNALLING CONTROL allows the workstation 80 to set the outgoing signalling state as required e.g. off hook;

WRITE CONTROL FUNCTIONS allows the workstation 80 to control any telephony routing available on the telephony switch 10 e.g. matrix switch functions.

In order for a standard data connection to function properly as a telephony link, it is of course necessary for the connection to provide sufficiently high bandwidth. The telephony data rate over an E1 is 8×30×2=0.48 MegaBytes/second (MB/s). Doubling this to allowing for signalling and overheads, a realistic bandwidth requirement is about 1 MB/s. This is well within the capability of basic SCSI, which provides 10 MB/s, or fast SCSI, which provides 20 MB/s. Clearly such a connection could therefore support multiple trunk lines. Other standard computer connections which could be used for attaching an external telephone interface device include FDDI (100 MB/s), ATM (25 or 100 MB/s), or a proposed new serial connection, SSA (200 MB/s).

In more complex environments which handle a larger number of telephony channels, more than one trunk line interfacing the telephone switch to the voice processing system may be required. Consequently the single telephone interface module attached to a single workstation must be replace by an environment having a group of voice processing workstations attached to multiple telephone interface modules.

Figure 8:
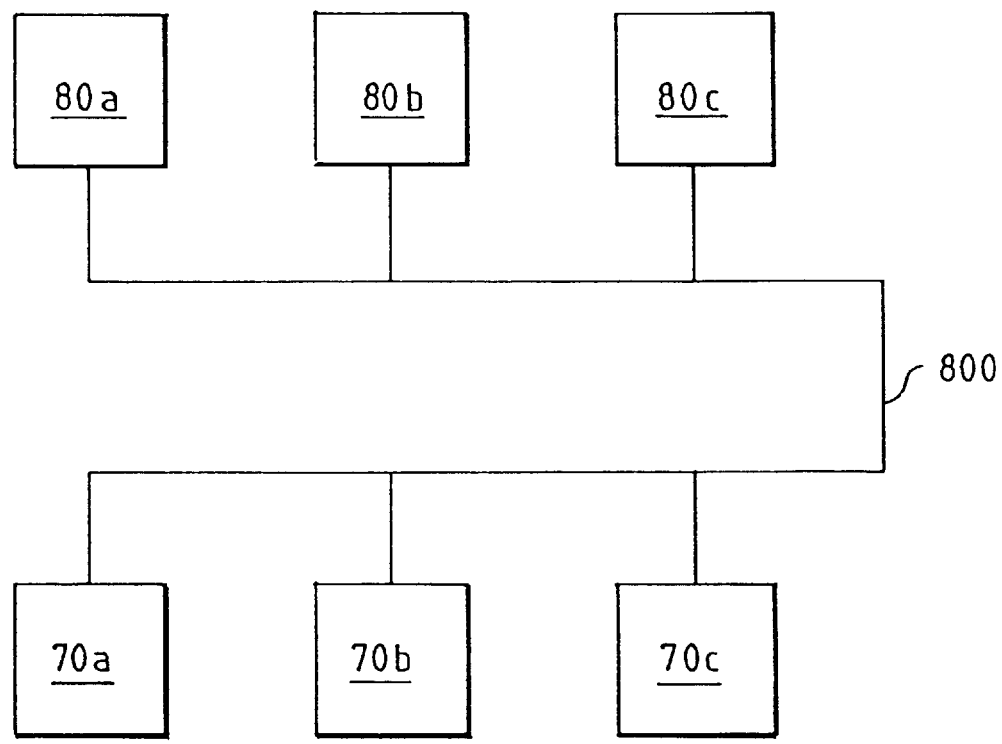
FIG. 8 is a simple block diagram showing multiple voice processing systems sharing the same standard data connection.

With reference to FIG. 8, an embodiment is shown having a group of workstation 80a–80c connected with a set telephone interface modules 70a, 70b, 70c. A single SCSI link 800 interfaces each device of one group with each device of the other group, with each device having a voice driver, a SCSI device driver and a SCSI adapter, as previously described with reference to FIG. 5. In order to allow each workstation to transmit commands to any particular telephone interface module attached to the link 800, target and initiator identifiers are included in each command, as per the normal SCSI protocol.

The use of the single SCSI cable to set up multiple voice processing systems provides added flexibility in complex installations. A particularly important advantage is that if one of the voice processing workstations goes down, then telephony voice data from its associated telephone interface modules can be quickly re-routed to a different voice processing system workstation, without any physical hardware intervention. This greatly improves the reliability of the overall voice processing installation.

The arrangement of FIG. 8 is flexible as regards numbers devices, there may be one or more voice processing workstations, and one or more telephone interface modules, (the number of workstations does not necessarily have to equal the number of telephone interface modules, depending on their relative capacity). Note that SCSI provides an upper limit on the number of devices attached to the link (maximum of 7), and it is necessary to ensure that the SCSI link has sufficient bandwidth to support all the different devices simultaneously. Clearly other standard data connections will have different limitations on device numbers and bandwidth.

The use of a standard data connection to transport telephony data allows an additional benefit to be realized, in that the inventors have realized that telephone switches already provide many of the functions carried by the telephone interface modules, e.g. DTMF detection/generation or call progress tone recognition. The prior art duplicates such functionality in the digital trunk processor. Since some modern switches essentially comprize conventional VME rack-mounted cards, which typically already include DSP processors and SCSI interfaces, this allows the telephone interface to be effectively moved into the switch itself, thereby eliminating the need for the telephone interface module. Telephony and signalling data can then be directly exchanged between the switch and voice processing workstation, using a mutually supported standard data connection.

Figure 7:
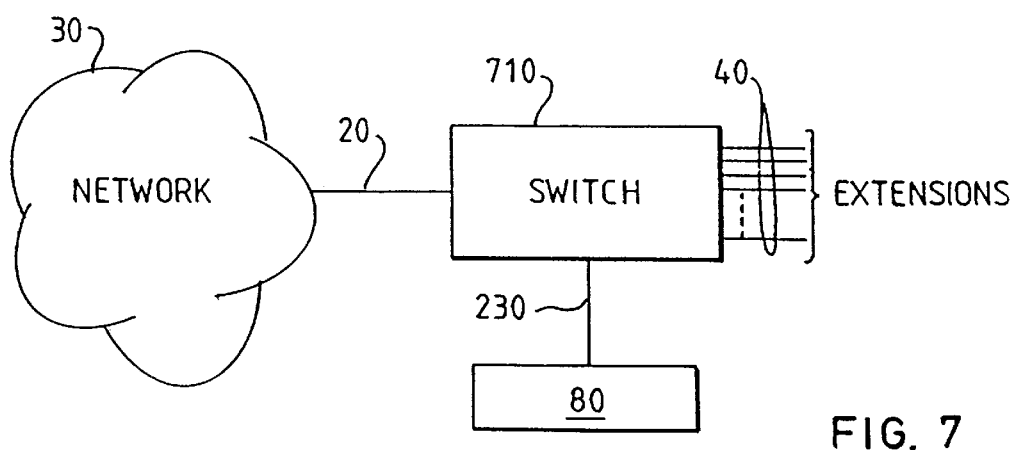
FIG. 7 is a simple block diagram showing an alternate embodiment of a voice processing system.

Referring now to FIG. 7, a preferred embodiment is shown in which the telephone interface module is no longer required because the DSP resources and SCSI interface in the telephony switch 710 are used to provide all the necessary voice processing telephony functions such as DTMF tone detection and generation, inbound and outbound signalling to the telephone network, call progress tone recognition etc. This example shows a standard data connection 230 from the conventional computer workstation 80 to the general purpose workstation which contains the voice processing software. This connection conveys both the voice data with telephone signalling and the control and notification data. Note that if the available bandwidth and transaction rate cannot achieved this target then an additional link for the control and notification can be add between the workstation 80 and the switch 710 (corresponding to the link 95 in FIG. 4).

In the embodiment of FIG. 7, the telephony switch 710 is provided with a SCSI interface corresponding to the one included in the digital trunk processor 70, including a voice driver 350, a SCSI device driver 345 and a SCSI adapter 340. This can be implemented as previously described on a single board computer, which is then rack-mounted into the switch. The link 230 connects the SCSI adapter 310 in the workstation 80 to the corresponding adapter 340 in the telephony switch 710. The process of exchanging voice data follows that described with reference to FIG. 6, since all the functions of the digital trunk processor 70 are now provided by the telephony switch 710. Note that requirement for a separate telephone interface module has now been eliminated, resulting in a substantial saving in hardware costs.

We claim:

1. A voice processing system adapted to interface to a telephone network, comprising a computer workstation attached to an interface device connected with the telephone network, the interface device comprising a telephone switch and supporting multiple incoming telephone lines, the system being characterized in that the computer workstation is attached to the interface device by a data connection selected from the group comprising ATM, FDDI, SCSI, Ethernet, and Serial Storage Architecture, over which multiple channels of real time voice telephony data are transmitted, the system including means for formatting the data in accordance with the transmission protocol to be used for the data connection, the computer workstation being capable of receiving and processing said multiple channels of real time voice telephony data simultaneously.

2. A voice processing system as claimed in claim 1 wherein the voice telephony data are split into blocks of fixed duration for transmission over the data connection.

3. A voice processing system as claimed in claim 1 wherein the telephone interface device is connected to the telephone network by one or more trunk lines.

4. A voice processing system as claimed in claim 3, wherein said trunk lines are digital E1 or T1 lines.

5. A voice processing system as claimed in claim 2 wherein the telephone interface device is connected to the telephone network by one or more trunk lines.

6. A voice processing system as claimed in claim 5, wherein said trunk lines are digital E1 or T1 lines.

7. A voice processing system as claimed in any preceding claim wherein the data connection is a SCSI connection.

8. A voice processing system as claimed in any of claims 1–6, wherein the data connection is an ATM connection.

9. A voice processing system as claimed in any of claims 1–6, wherein the data connection is an FDDI connection.

10. A group of voice processing systems as claimed in any of claims 1–6, wherein each computer workstation and each interface device are attached to one another sharing the same data connection.

11. A voice processing system as claimed in claim 10 wherein the data connection is a SCSI connection.

12. A voice processing system as claimed in claim 10, wherein the data connection is an ATM connection.

13. A voice processing system as claimed in claim 10, wherein the data connection is an FDDI connection.

* * * * *